E. HOLMES.
TRUCK.
APPLICATION FILED MAY 5, 1913.
1,100,702.
Patented June 16, 1914.
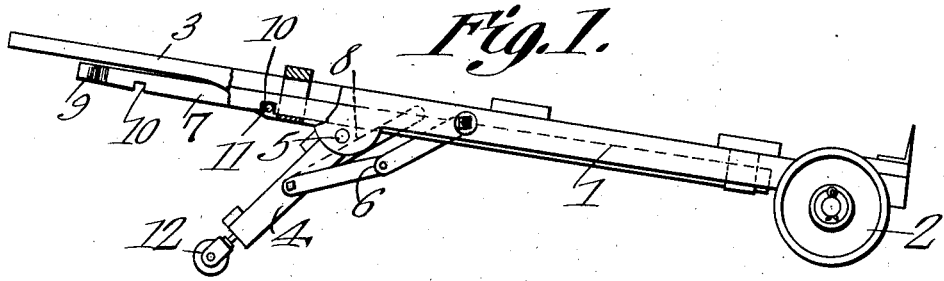
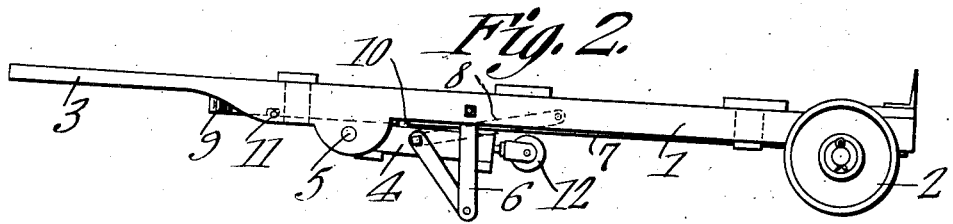
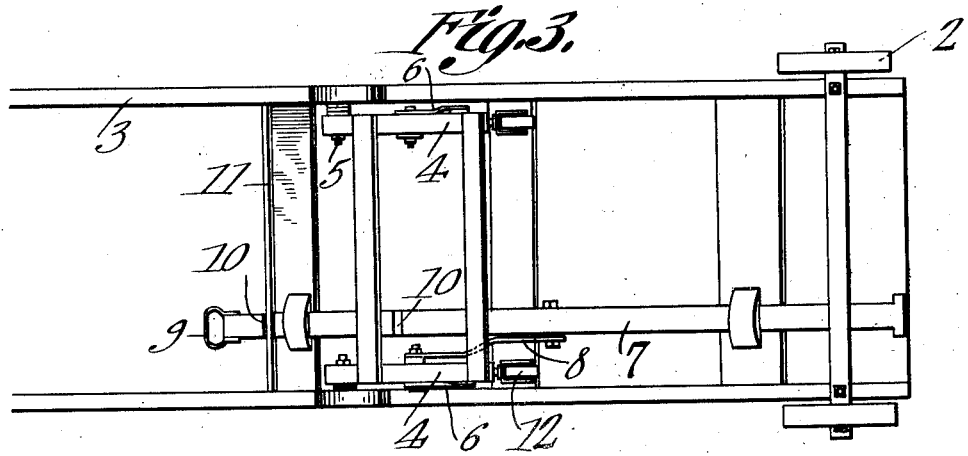
E. Holmes,
Inventor
Witnesses
by C. A. Snow & Co.,
Attorneys

UNITED STATES PATENT OFFICE.

EDISON HOLMES, OF NORTHWILKESBORO, NORTH CAROLINA.

TRUCK.

1,100,702.  Specification of Letters Patent.  Patented June 16, 1914.

Application filed May 5, 1913. Serial No. 765,655.

*To all whom it may concern:*

Be it known that I, EDISON HOLMES, a citizen of the United States, residing at Northwilkesboro, in the county of Wilkes and State of North Carolina, have invented a new and useful Truck, of which the following is a specification.

My invention relates to new and useful improvements in trucks and more particularly to hand trucks.

The object of the invention is the provision of a truck which can be easily moved from place to place and which can be lowered into a convenient position for loading and then raised for moving.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a side elevation of the truck raised. Fig. 2 is a side elevation of the truck lowered. Fig. 3 is a bottom plan view.

In the drawings, the numeral 1 indicates the platform of usual construction having the wheels 2 on one end and the handles 3 on the opposite end. Legs 4 are pivotally connected to the platform at 5 and braces 6 comprising a pair of links are connected to the platform and legs. A bar 7 is slidably connected to the bottom of the platform as clearly shown in Fig. 3 and a rod 8 is connected to this sliding bar and to one of the legs 4. This bar 7 is provided on one end with the hand hold 9 and the bar is also provided with the notches 10 adapted to engage the cross rod 11 on the platform of the truck. Wheels 12 are secured to the legs 4 and engage the ground when the legs are lowered.

Having fully described the details of my device it is thought that the operation will be clear. When it is desired to load the truck the legs are raised as shown in Fig. 2 of the drawings and the links forming the braces 6 will assume the position shown in Fig. 2 and form a support for the truck. After the truck is loaded the legs are lowered by sliding the bar toward the operator which through means of the connection 8 will lower the legs and the brace 6 and the legs will assume the position shown in Fig. 1 of the drawing. When the legs are lowered as shown in Fig. 1, the wheels 12 on the legs 4 contact with the ground and the truck can then be easily moved from one place to another.

Having fully described my invention what I claim as new and desire to secure by Letters Patent is:—

1. A hand truck comprising a platform, legs pivoted to the platform, wheels on the legs, and braces connected to the platform and legs, said braces forming a support for the platform when the legs are raised.

2. A hand truck comprising a platform, legs pivoted to the platform, wheels on the legs, braces connected to the platform and legs in such a manner that when the legs are raised the braces will form a support for the platform, and means for raising and lowering the legs.

3. A hand truck comprising a platform, wheels on one end of the platform, handles on the opposite end of the platform, legs pivoted to the platform, wheels on the legs, and a pair of links connected to each side of the platform and legs, said links forming a support for the platform when the legs are raised.

4. A hand truck comprising a platform, legs pivoted to the platform, braces connected to the platform and legs, said braces forming a support for the platform when the legs are raised, a bar slidably connected to the platform, and means connecting the bar and legs for raising and lowering the legs.

5. A hand truck comprising a platform, legs pivoted to the platform, braces connected to the platform and legs, said braces forming a support for the platform when the legs are raised, a rod extending across the platform, a slidable bar connected to the platform and provided with notches adapted to engage the rod, and means connecting the bar and legs for raising and lowering the legs.

In testimony that I claim the foregoing as my own, I have hereto affixed my signature in the presence of two witnesses.

EDISON HOLMES.

Witnesses:
 LATTA CALDWELL,
 LUCILE TURNER.